US012580894B2

(12) United States Patent
Rosomakho

(10) Patent No.: US 12,580,894 B2
(45) Date of Patent: Mar. 17, 2026

(54) SYSTEMS AND METHODS FOR A HYPERTEXT TRANSFER PROTOCOL SECURE (HTTPS) PROXY SERVICE

(71) Applicant: Zscaler, Inc., San Jose, CA (US)

(72) Inventor: Yaroslav Rosomakho, Thatcham (GB)

(73) Assignee: Zscaler, Inc., San Jose, CA (US)

( * ) Notice: Subject to any disclaimer, the term of this patent is extended or adjusted under 35 U.S.C. 154(b) by 91 days.

(21) Appl. No.: 18/591,458

(22) Filed: Feb. 29, 2024

(65) Prior Publication Data

US 2025/0279984 A1 Sep. 4, 2025

(51) Int. Cl.
*H04L 9/40* (2022.01)
(52) U.S. Cl.
CPC ...... *H04L 63/0281* (2013.01); *H04L 63/0823* (2013.01); *H04L 63/166* (2013.01)
(58) Field of Classification Search
CPC ............. H04L 63/0281; H04L 63/0823; H04L 63/166
See application file for complete search history.

(56) References Cited

U.S. PATENT DOCUMENTS

| | | | |
|---|---|---|---|
| 8,010,085 B2 | 8/2011 | Apte et al. | |
| 8,656,462 B2 | 2/2014 | Kailash et al. | |
| 9,003,186 B2 | 4/2015 | Kailash et al. | |
| 9,065,800 B2 | 6/2015 | Narasimhan et al. | |
| 9,350,644 B2 | 5/2016 | Mahajan et al. | |
| 9,531,758 B2 | 12/2016 | Devarajan et al. | |

| | | | | |
|---|---|---|---|---|
| 10,104,060 B2 * | 10/2018 | Datta | .................. | H04L 63/0823 |
| 10,432,588 B2 | 10/2019 | Singh | | |
| 10,728,246 B2 | 7/2020 | Bansal | | |
| 10,958,662 B1 * | 3/2021 | Sole | ..................... | H04L 63/0853 |
| 11,134,058 B1 * | 9/2021 | Sole | ..................... | G06F 21/554 |
| 11,457,040 B1 * | 9/2022 | Sole | ..................... | H04L 63/101 |
| 11,489,828 B2 * | 11/2022 | Peddada | .............. | H04L 63/166 |
| 11,818,279 B2 * | 11/2023 | Williams | ............ | H04L 63/0209 |
| 12,166,747 B2 * | 12/2024 | Zeng | ..................... | H04L 9/0631 |
| 12,199,858 B2 * | 1/2025 | S | ........................... | H04L 47/125 |
| 2002/0161904 A1 * | 10/2002 | Tredoux | ............ | H04L 63/0281 |
| | | | | 709/229 |

(Continued)

OTHER PUBLICATIONS

J. Hiller, M. Henze, T. Zimmermann, O. Hohlfeld and K. Wehrle, "The Case for Session Sharing: Relieving Clients from TLS Handshake Overheads," 2019 IEEE 44th LCN Symposium on Emerging Topics in Networking (LCN Symposium), Osnabrueck, Germany, 2019, pp. 83-91 (Year: 2019).*

(Continued)

*Primary Examiner* — Jung W Kim
*Assistant Examiner* — Sameera Wickramasuriya
(74) *Attorney, Agent, or Firm* — Baratta Law PLLC; Lawrence A. Baratta, Jr.

(57) ABSTRACT

Systems and methods for a Hypertext Transfer Protocol Secure (HTTPS) proxy service include monitoring traffic via a cloud, the traffic being monitored inline between one or more endpoints and one or more destinations; performing a mutual TLS (mTLS) handshake with an endpoint of the one or more endpoints based on a request to a destination of the one or more destinations; deriving endpoint information based on the mTLS handshake; and performing one or more actions on the request based on the endpoint information.

20 Claims, 7 Drawing Sheets

700

```
                                                              ┌─702
  ┌─────────────────────────────────────────┐
  │ MONITORING TRAFFIC VIA A CLOUD, THE TRAFFIC │
  │ BEING MONITORED INLINE BETWEEN ONE OR     │
  │ MORE ENDPOINTS AND ONE OR MORE            │
  │ DESTINATIONS                              │
  └─────────────────────────────────────────┘
                     │
                                                              ┌─704
  ┌─────────────────────────────────────────┐
  │ PERFORMING A MUTUAL TLS (MTLS) HANDSHAKE  │
  │ WITH AN ENDPOINT OF THE ONE OR MORE       │
  │ ENDPOINTS BASED ON A REQUEST TO A         │
  │ DESTINATION OF THE ONE OR MORE            │
  │ DESTINATIONS                              │
  └─────────────────────────────────────────┘
                     │
                                                              ┌─706
  ┌─────────────────────────────────────────┐
  │ DERIVING ENDPOINT INFORMATION BASED ON    │
  │ THE MTLS HANDSHAKE                         │
  └─────────────────────────────────────────┘
                     │
                                                              ┌─708
  ┌─────────────────────────────────────────┐
  │ PERFORMING ONE OR MORE ACTIONS ON THE     │
  │ REQUEST BASED ON THE ENDPOINT             │
  │ INFORMATION                               │
  └─────────────────────────────────────────┘
```

(56)     References Cited

U.S. PATENT DOCUMENTS

| | | | | |
|---|---|---|---|---|
| 2010/0023762 | A1 | 1/2010 | Kailash et al. | |
| 2010/0318784 | A1* | 12/2010 | Rao ...................... | H04L 63/166 |
| | | | | 713/168 |
| 2017/0223054 | A1* | 8/2017 | Wing .................. | H04L 63/0281 |
| 2019/0166160 | A1* | 5/2019 | Syvänne ............. | H04L 63/0227 |
| 2019/0228144 | A1* | 7/2019 | Kermes .............. | H04L 63/0861 |
| 2020/0077265 | A1 | 3/2020 | Singh et al. | |
| 2021/0105275 | A1 | 4/2021 | Bansal et al. | |
| 2021/0377210 | A1 | 12/2021 | Singh et al. | |
| 2022/0286494 | A1* | 9/2022 | Zheng ................ | H04L 63/0281 |
| 2022/0294830 | A1 | 9/2022 | Kailash et al. | |
| 2023/0247006 | A1* | 8/2023 | Pemmaraju .......... | H04L 63/168 |
| | | | | 726/11 |
| 2023/0344917 | A1 | 10/2023 | Chanak et al. | |

OTHER PUBLICATIONS

Bradatsch, Leonard, Frank Kargl, and Oleksandr Miroshkin. "Zero trust service function chaining." arXiv preprint arXiv:2107.08671 (2021). (Year: 2021).*

* cited by examiner

700

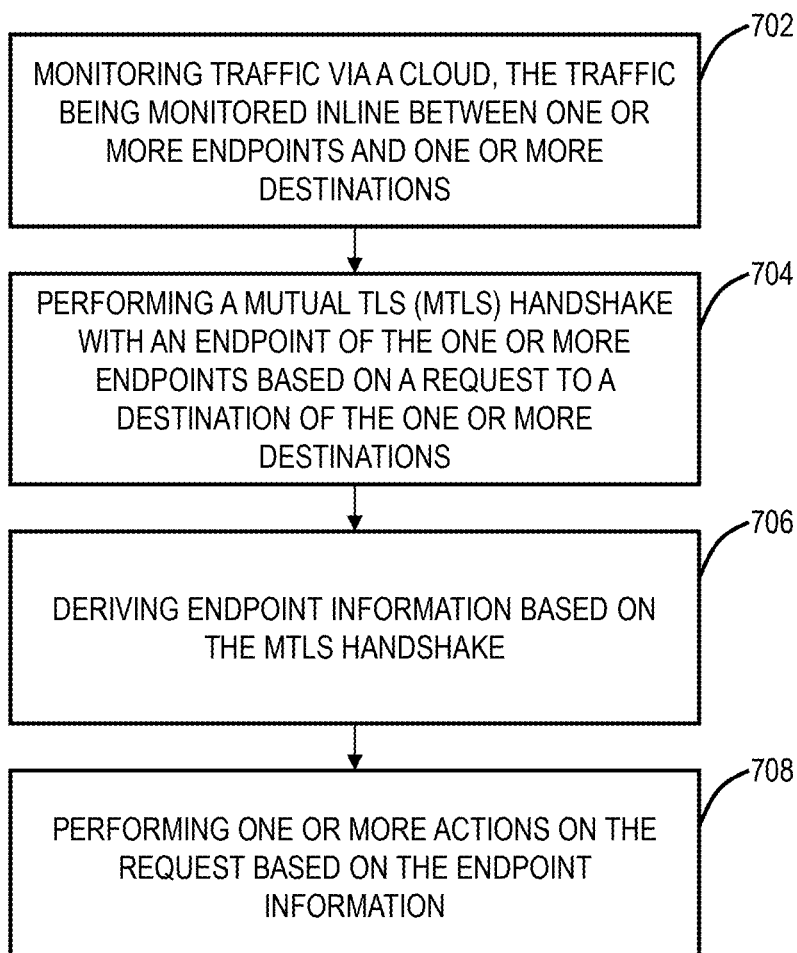

MONITORING TRAFFIC VIA A CLOUD, THE TRAFFIC BEING MONITORED INLINE BETWEEN ONE OR MORE ENDPOINTS AND ONE OR MORE DESTINATIONS

702

PERFORMING A MUTUAL TLS (MTLS) HANDSHAKE WITH AN ENDPOINT OF THE ONE OR MORE ENDPOINTS BASED ON A REQUEST TO A DESTINATION OF THE ONE OR MORE DESTINATIONS

704

DERIVING ENDPOINT INFORMATION BASED ON THE MTLS HANDSHAKE

706

PERFORMING ONE OR MORE ACTIONS ON THE REQUEST BASED ON THE ENDPOINT INFORMATION

SYSTEMS AND METHODS FOR A HYPERTEXT TRANSFER PROTOCOL SECURE (HTTPS) PROXY SERVICE

FIELD OF THE DISCLOSURE

The present disclosure generally relates to network and cloud security. More particularly, the present disclosure relates to systems and methods for a Hypertext Transfer Protocol Secure (HTTPS) proxy service.

BACKGROUND OF THE DISCLOSURE

The use of explicit Hypertext Transfer Protocol (HTTP) proxy can introduce various issues when users are attempting to access destinations from remote locations. Typically, specific dedicated ports are assigned to customers of multitenant proxy services in order to be able to distinguish which tenant traffic is originating from. Such non-standard ports are often filtered in guest Wi-Fi environments, forcing endpoints in remote locations to utilize common ports such as TCP port 80, TCP port 443, and UDP port 443. Additionally, various security concerns can be raised when utilizing HTTP proxy. These security concerns are introduced due to the need to decrypt TLS traffic in order to obtain cookies for user identification. Thus, when it is desired to obtain and decipher a customer and user identity, HTTP proxy can hinder the capabilities of various systems and introduce security risks. The present systems and methods provide a Hypertext Transfer Protocol Secure (HTTPS) proxy service.

BRIEF SUMMARY OF THE DISCLOSURE

The present disclosure relates to systems and methods for a Hypertext Transfer Protocol Secure (HTTPS) proxy service. In various embodiments, the present disclosure includes a method having steps, a processing device configured to implement the steps, a cloud-based system configured to implement the steps, and as a non-transitory computer-readable medium storing instructions for programming one or more processors to execute the steps. The steps include monitoring traffic via a cloud, the traffic being monitored inline between one or more endpoints and one or more destinations; performing a mutual TLS (mTLS) handshake with an endpoint of the one or more endpoints based on a request to a destination of the one or more destinations; deriving endpoint information based on the mTLS handshake; and performing one or more actions on the request based on the endpoint information.

The process 700 can further include wherein the one or more actions include allowing the request to the destination or blocking the request to the destination. The one or more actions can include allowing the request to the destination, wherein the steps further include creating a connection between the endpoint and the destination; and enforcing policy on traffic between the endpoint and the destination based on the endpoint information. Creating a connection between the endpoint and the destination can include creating a connection between the cloud and the endpoint and a connection between the cloud and the destination. Performing the mTLS handshake can include receiving a client certificate and a Server Name Indication (SNI) from the endpoint. The deriving of endpoint information can include deriving a user identity from the client certificate and deriving a customer name from the SNI. Prior to performing the mTLS handshake, the steps can include performing a TCP handshake via port 443 or establishing QUIC connection on UDP port 443.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a flow chart of a process for a Hypertext Transfer Protocol Secure (HTTPS) proxy service.

DETAILED DESCRIPTION OF THE DISCLOSURE

Again, the present disclosure relates to systems and methods for a Hypertext Transfer Protocol Secure (HTTPS) proxy service. Instead of using an HTTP proxy, various embodiments utilize an HTTPS proxy service. The present HTTPS proxy service essentially wraps the initial TCP connection between an endpoint and the cloud in a TLS connection or replaces it with a Quick UDP Internet Connection (QUIC) connection. Instead of performing the initial TCP handshake to a customer dedicated port, a TCP handshake is performed, for example against port 443, or any other pre-defined port. Alternatively, QUIC handshake performed on UDP port 443, or any other pre-defined UDP port. Therefore, for an external observer, it seems like any regular web traffic. Instead of sending a clear text CONNECT message before the HTTP request, a mutual TLS (mTLS) handshake is performed first. The present HTTPS proxy service solves various security concerns introduced by traditional HTTP proxy usage.

§ 1.0 Cybersecurity Monitoring and Protection Examples

Figure 1A:
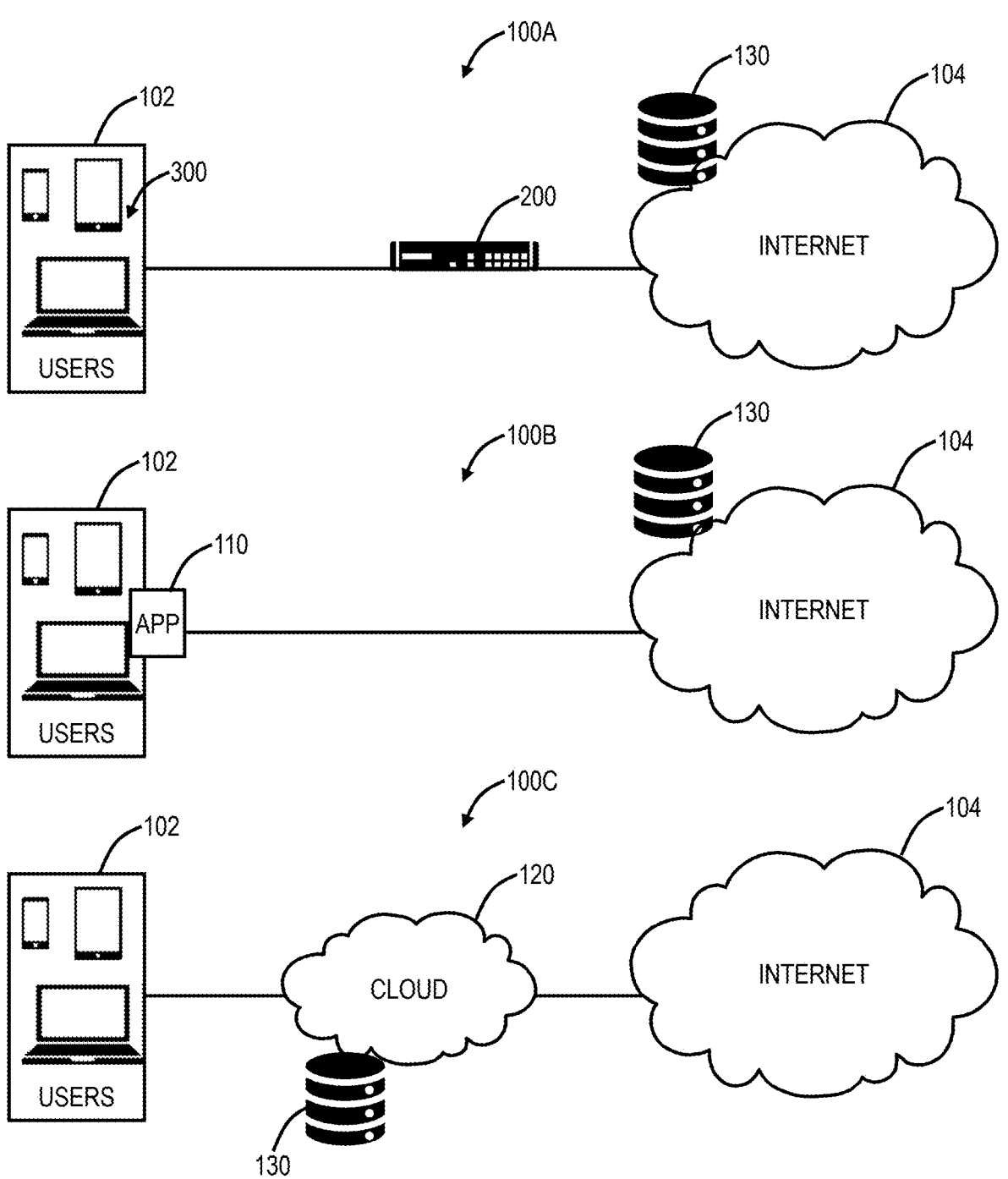
FIG. 1A is a network diagram of three example network configurations of cybersecurity monitoring and protection of a user.
Figure 2:
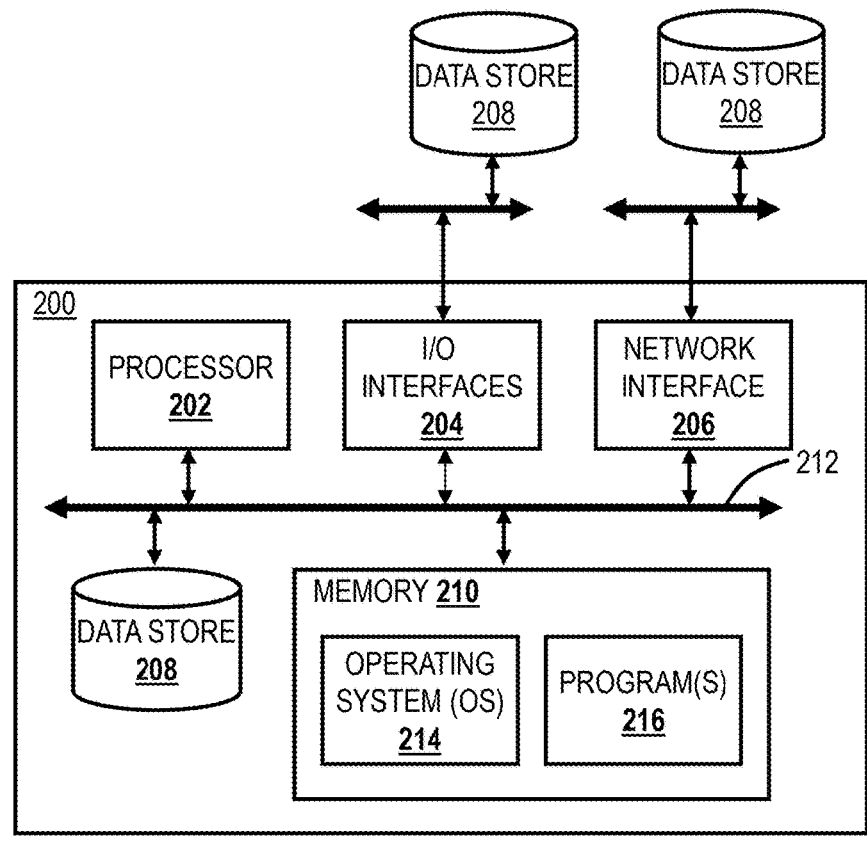
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 (connector application) that is executed on the computing device 300. The connector application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the connector application 110 in the network configuration 100B and the server 200 in the network configuration 100A. Logically, the cloud 120 can be viewed as an overlay network between endpoints 102 and the Internet 104 (and cloud services, SaaS, other destinations, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
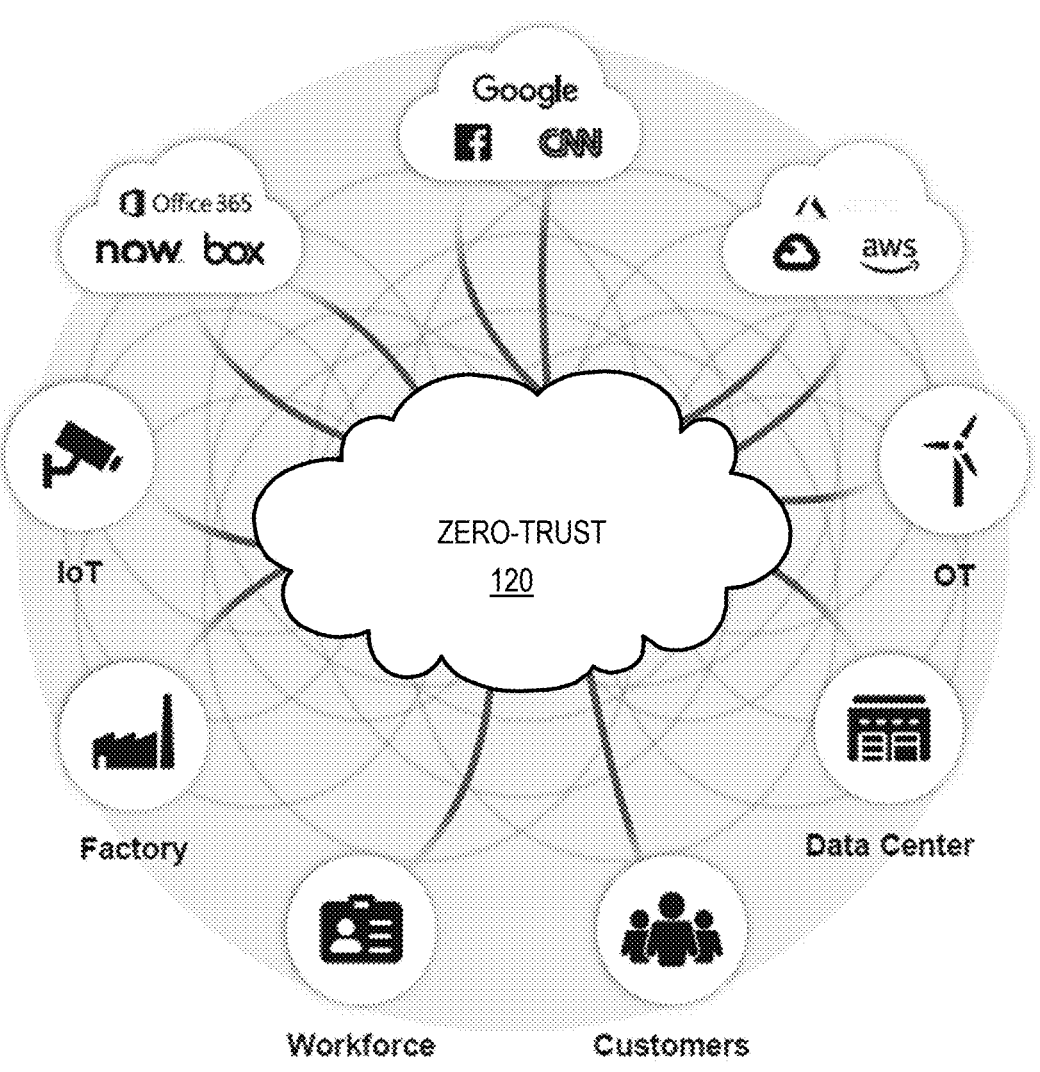
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates-in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination-to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a endpoint's 102 activity. That is, the log data 130 is not merely confined to specific activity (e.g., an endpoint's 102 social networking activity on a specific site, an endpoint's 102 search requests on a specific search engine, etc.), that is, when the endpoint 102 is a user.

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210.

It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example Computing Device Architecture

Figure 3:
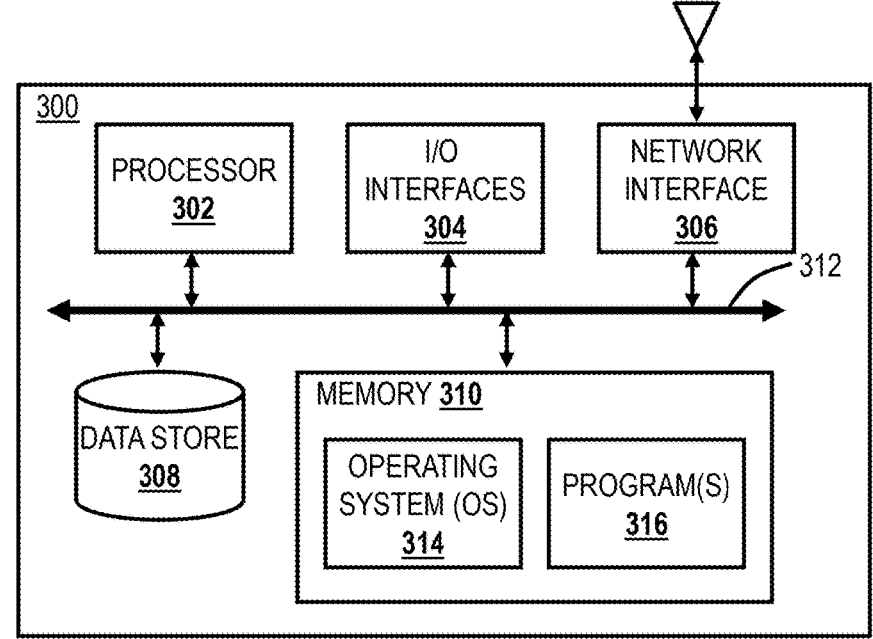
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface

306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The connector application 110 can be one of the example programs.

§ 4.0 Application for Traffic Forwarding and Monitoring

Again, the network configuration 100B includes a connector application 110 that is executed on the computing device 300. The connector application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the connector application 110 can perform similar functionality as the cloud 120, as well as coordinated functionality with the cloud 120.

Figure 4:
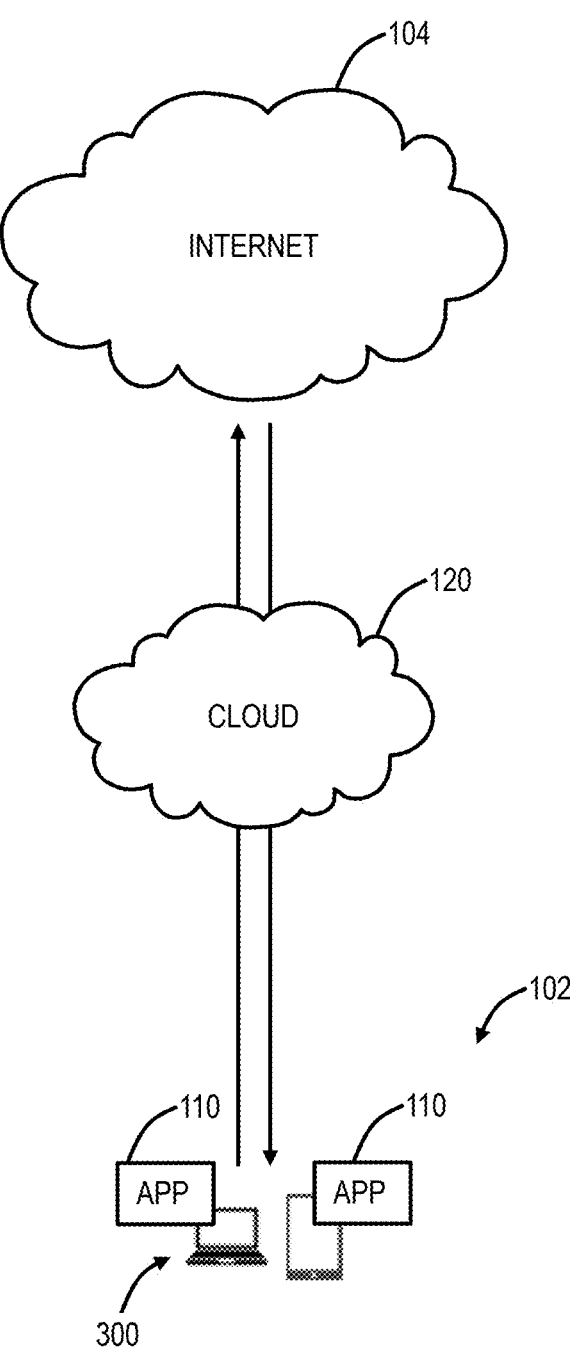
FIG. 4 is a diagram of an exemplary network configuration illustrating an application on computing devices configured to operate through the cloud.

FIG. 4 is a network diagram of an exemplary network configuration illustrating a connector application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The connector application 110 can automatically forward user traffic with the cloud 120 as well as ensuring that security and access policies are enforced, regardless of device, location, operating system, or application. The connector application 110 automatically determines if an endpoint 102 is looking to access the open Internet 104, a SaaS app, or an internal app running in public, private, or the datacenter and routes mobile traffic through the cloud 120. The connector application 110 can support various cloud services, including ZIA, ZPA, ZDX, etc., allowing the best in class security with zero trust access to internal applications. As described herein, the connector application 110 can also be referred to as a connector application.

The connector application 110 is configured to auto-route traffic for seamless user experience. This can be protocol as well as application-specific, and the connector application 110 can route traffic with a nearest or best fit node of the cloud 120. Further, the connector application 110 can detect trusted networks, allowed applications, etc. and support secure network access. The connector application 110 can also support the enrollment of the computing device 300 prior to accessing applications, the internet, or any services provided by the cloud 120. The connector application 110 can uniquely detect the endpoints 102 based on fingerprinting the computing device 300, using criteria like device model, platform, operating system, device posture, etc. The connector application 110 can support Mobile Device Management (MDM) functions, allowing IT personnel to deploy and manage the computing devices 300 seamlessly. This can also include the automatic installation of client and SSL certificates during enrollment. Finally, the connector application 110 provides visibility into device and app usage of the computing device 300, when a user is the endpoint 102 utilizing the computing device 300.

The connector application 110 supports a secure, lightweight tunnel between the computing device 300 and the cloud 120. For example, the lightweight tunnel can be HTTP-based. With the connector application 110, there is no requirement for PAC files, an IPSec VPN, authentication cookies, or user setup.

§ 5.0 HTTPS Proxy

As described, the services provided by the cloud 120 can benefit from operation of the connector application 110 operating on computing devices 300. Although, in some cases, the installation and operation of the connector application 110 is not permitted due to various reasons. These reasons can range from computing devices being administratively restricted, computing devices which run software that does not permit connector application installation, regulatory reasons, and the like. Thus, because of such reasons, utilization of the connector application 110 can, in some cases, not be an option steering traffic to the cloud 120.

Figure 5:
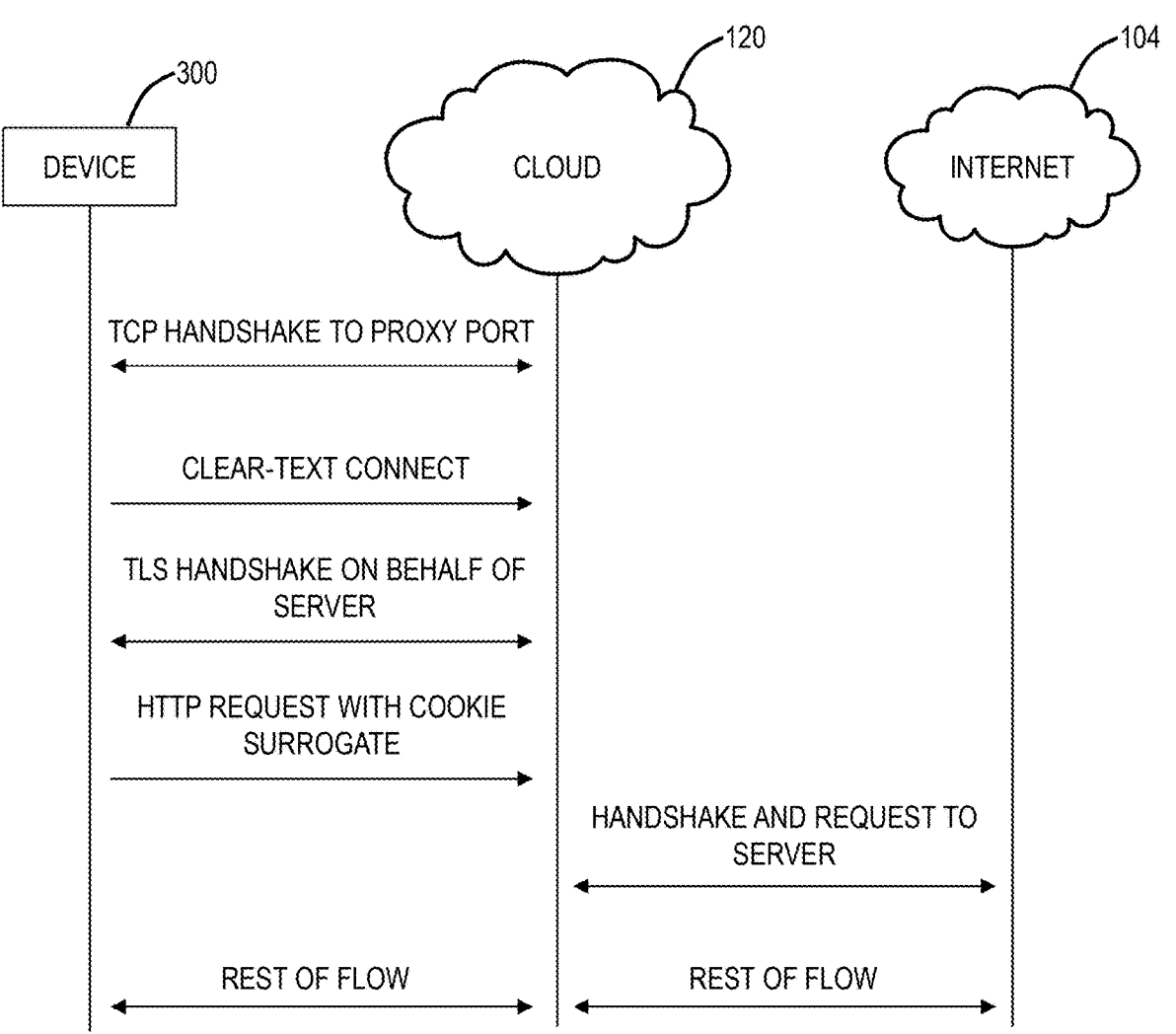
FIG. 5 is a flow diagram of a network configuration including an endpoint, the cloud, and a destination utilizing an explicit HTTP proxy.

As a solution to such restrictions, other steering mechanisms can be enabled. In some cases, the use of an Hypertext Transfer Protocol (HTTP) proxy can enable steering functions similar to the steering functions performed by the connector application 110. Further, HTTP proxies are supported by a wide range of devices and web browsers. FIG. 5 is a flow diagram of network traffic including a computing device 300, the cloud 120, and a destination such as the internet 104 utilizing an explicit HTTP proxy. A customer can configure the cloud 120 as its explicit proxy to a web browser application or the like. In this case, the computing device, via the web browser, performs a Transmission Control Protocol (TCP) handshake to the proxy port. The computing device then sends a CONNECT message in clear text. After the connect message is sent, it can perform a Transport Layer Security (TLS) handshake with the cloud 120. In this case, the cloud 120 pretends to be the server associated with the requested destination. Thus, the computing device sends the HTTP request within the TLS connection to the cloud 120, and the cloud 120 performs a handshake with the actual destination. The flow can then be connected between the endpoint (i.e., the computing device 300) and the destination (i.e., the internet 104) by the cloud 120 while inspecting traffic inline.

In the examples described herein, a computing device 300 is shown as requesting a connection to the internet 104. It will be appreciate that the computing device can be any endpoint 102, while the internet 104 can be any destination such as private applications, enterprise networks, etc.

Utilizing an explicit HTTP proxy process such as the one depicted in FIG. 5 can introduce various issues. One major issue is due to the CONNECT message being sent in clear text. This is a security concern, because if a malicious actor is listening to communications between the computing device 300 and the cloud 120, they can potentially learn where the traffic is ultimately going. Therefore, any observer who has access to packets between the computing device 300 and the cloud 120 would be able to see the destination. Secondly, because this process requires a dedicated proxy port for the customer, it can introduce issues relating to limited available ports. This is because there are a limited number of ports, and dedicating individual ports per customer for differentiation can result in available ports becoming a limited resource. Further, in certain environments such as when utilizing a guest Wi-Fi network, any port other than TCP 443 or TCP 80 could be blocked. Therefore, users may not be able to access services offered by the cloud 120.

Additionally, the cookie surrogate sent along with the HTTP request is effectively the identifier of the user who is making the request. There are two significant issues associated with cookie surrogates. Firstly, for this user attribution to work, endpoint software needs to support cookies. Secondly, in order to get to the cookie surrogate, the cloud 120 needs to decrypt all of the TLS traffic. Some customers of the cloud 120 may not want to decrypt certain traffic associated with private applications, and certain sensitive applications including personal banking or healthcare applications. Further, they may also be using certificate pinned applications, thus it may not be possible to decrypt that traffic.

Figure 6:
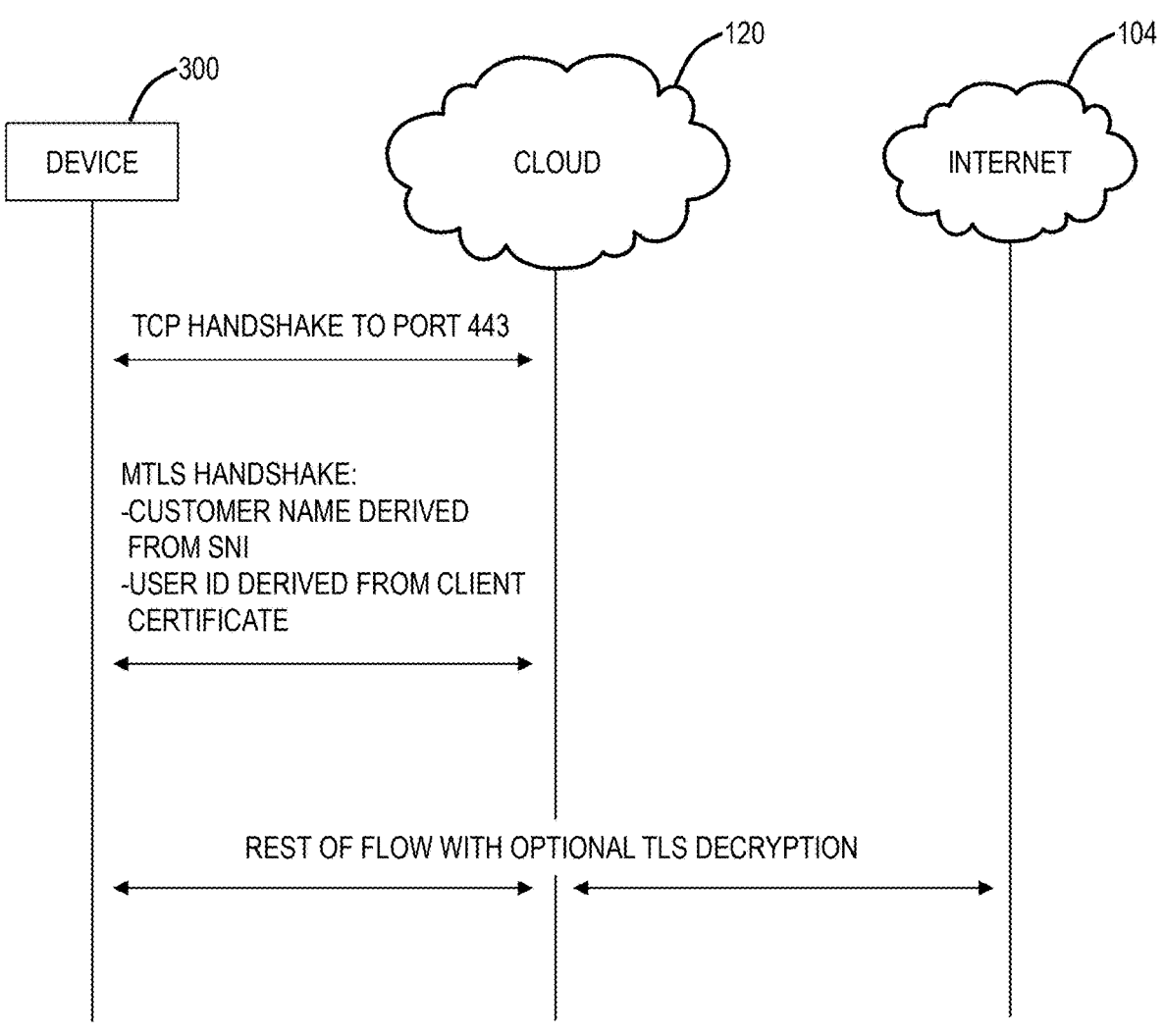
FIG. 6 is a flow diagram of a network configuration including an endpoint, the cloud, and a destination utilizing an HTTPS proxy service.

The present disclosure provides systems and methods for a Hypertext Transfer Protocol Secure (HTTPS) proxy service. FIG. 6 is a flow diagram of a network configuration including a computing device 300, the cloud 120, and a destination such as the internet 104 utilizing an HTTPS proxy service. Instead of using an HTTP proxy, various embodiments utilize an HTTPS proxy service. The present HTTPS proxy service essentially wraps the initial TCP connection between the endpoint 102 (i.e., the computing device 300) and the cloud 120 in a TCP/TLS or UDP/QUIC/TLS connection. Instead of performing the initial TCP handshake to a customer dedicated port, a TCP or QUIC handshake is performed to a common shared port such as 443. Therefore, for an external observer, it would seem like any regular web traffic. Instead of sending the clear text CONNECT message before the HTTP request, a mutual TLS (mTLS) handshake is performed. The client endpoint includes customer specific Server Name Identification (SNI) in the ClientHello message. This SNI may be encrypted through Encrypted Client Hello (ECH) mechanism to hide customer identifier from a malicious passive observer. Later in the TLS handshake the endpoint presents a certificate to the cloud 120, and from the certificate, the cloud 120 can derive and validate the user identity. Thus, before connecting the user and the service/destination, the cloud 120 will reliably know who the customer and the user associated with the traffic is. The cloud 120 can then provide any of its security services based on the customer name and user ID, for example, based on customer or user-based policies. That is, the cloud 120 can perform one or more actions to the traffic based on the endpoint information, the endpoint information being the user ID and customer name. The one or more actions can include, as described herein, allowing requests, blocking requests, performing any security checks, enforcing customer or user-based policy, etc.

Since the HTTPS proxy service allows encapsulation of an arbitrary IP flow, the HTTPS Proxy service described above can be used to deliver every Secure Access Service Edge (SASE) service, such as CASB, SWG, ZTNA, CFW and others for any user operated endpoint such as desktop, laptop, mobile phone, tablet and kiosk as well as autonomous endpoints such as workloads, OT/IoT or automation equipment.

If the cloud 120 determines, based on the endpoint information, that a connection is authorized, a connection between the endpoint and the destination is created. This can include creating a connection between the cloud and the endpoint and a connection between the cloud and the destination. Again, this connection can be monitored inline by the cloud 120 for any of the access control, and data protection services described herein.

The endpoint provides SNI and client certificate with every new proxy request. To increase efficiency and prevent a new proxy handshake for every new request, the endpoint may utilize techniques such as HTTP/1.1 request pipelining and multiple concurrent streams available in HTTP/2 and HTTP/3 protocols.

In various embodiments, the customer name is derived from the Server Name Indication (SNI) obtained through the mTLS handshake. Similarly, the user identity is derived from the client certificate. The client certificate and the SNI can both be obtained through the mTLS handshake.

An exemplary benefit of the present systems and methods includes improvement of privacy. Any passive observer between the user and the cloud 120 is not able to deduce the ultimate destination of the traffic. The present HTTPS proxy service makes the explicit proxy available everywhere, including where only TCP port 443 is available. It does not require a dedicated proxy port, and it does not require the cloud 120 to decrypt all TLS traffic in order to get a user identifier, as it is determined from the client certificate on the initial TLS handshake phase. That is, TLS decryption becomes optional and is not required. By utilizing the present HTTPS proxy service, roaming users can be reliably steered when the connector application 110 is not a viable option.

The present HTTPS proxy resolves a number of key limitations of traditional HTTP proxies including requirements to decrypt all traffic, support of Cross-Origin Requests (CORS) without losing precise user attribution and it is compatible with web and non-web internet traffic. Since it is using certificates for user identification and authorization, interactive flows such as SAML or OIDC are not required and thus the HTTPS proxy can be used with non-interactive endpoints that do not run web browsers such as workflows and IoTs.

§ 5.1 Process for HTTPS Proxy Service

FIG. 7 is a flow chart of a process 700 for a Hypertext Transfer Protocol Secure (HTTPS) proxy service. The process 700 includes monitoring traffic via a cloud, the traffic being monitored inline between one or more endpoints and one or more destinations (step 702); performing a mutual TLS (mTLS) handshake with an endpoint of the one or more endpoints based on a request to a destination of the one or more destinations (step 704); deriving endpoint information based on the mTLS handshake (step 706); and performing one or more actions on the request based on the endpoint information (step 708).

The process 700 can further include wherein the one or more actions include allowing the request to the destination or blocking the request to the destination. The one or more actions can include allowing the request to the destination, wherein the steps further include creating a connection between the endpoint and the destination; and enforcing policy on traffic between the endpoint and the destination based on the endpoint information. Creating a connection between the endpoint and the destination can include creating a connection between the cloud and the endpoint and a connection between the cloud and the destination. Performing the mTLS handshake can include receiving a client certificate and a Server Name Indication (SNI) from the endpoint. The deriving of endpoint information can include deriving a user identity from the client certificate and deriving a customer name from the SNI. Prior to performing the mTLS handshake, the steps can include performing a TCP handshake via port 443 or UDP/QUIC handshake via UDP port 443.

§ 6.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
    monitoring traffic via a cloud, the traffic being monitored inline between one or more endpoints and one or more destinations;
    receiving, at the cloud configured as an explicit HTTPS proxy for an endpoint of the one or more endpoints, a connection request on a shared port comprising a Transmission Control Protocol (TCP) port 443 or Quick User Datagram Protocol (UDP) Internet Connection (QUIC) on UDP port 443;
    performing a mutual Transport Layer Security (mTLS) handshake with the endpoint of the one or more endpoints as an initial proxy onboarding step and in lieu of transmitting a clear-text HTTP CONNECT message based on a request to a destination of the one or more destinations;
    deriving endpoint information based on the mTLS handshake, including deriving a user identity from a client certificate presented by the endpoint and deriving a tenant or customer identity from a Server Name Indication (SNI) conveyed in a ClientHello, the SNI optionally being protected using Encrypted Client Hello (ECH); and
    performing one or more actions on the request based on the endpoint information, including authorizing or denying the request to the destination without decrypting application-layer TLS of subsequent traffic between the cloud and the destination.

2. The method of claim 1, wherein the one or more actions includes allowing the request to the destination or blocking the request to the destination.

3. The method of claim 1, wherein the one or more actions includes allowing the request to the destination, and the steps further comprise:
    creating a connection between the endpoint and the destination; and
    enforcing policy on traffic between the endpoint and the destination based on the endpoint information, wherein the policy is enforced while maintaining end-to-end TLS between the cloud and the destination without decrypting a destination-facing TLS session.

4. The method of claim 3, wherein creating the connection between the endpoint and the destination includes creating a connection between the cloud and the endpoint and a connection between the cloud and the destination, the connection between the cloud and the endpoint being carried over HTTP/2 or HTTP/3 to support request multiplexing so as to avoid repeating the mTLS handshake for subsequent requests.

5. The method of claim 1, wherein performing the mTLS handshake includes receiving the client certificate and the SNI from the endpoint, the SNI encoding the customer identity associated with the endpoint.

6. The method of claim 5, wherein the deriving endpoint information includes deriving the user identity from the client certificate and deriving the customer identity from the SNI.

7. The method of claim 1, wherein prior to performing the mTLS handshake, the steps include performing any of a TCP handshake with the endpoint via a pre-defined port including the TCP port 443, and performing a QUIC handshake via a pre-defined port including the UDP port 443.

8. A non-transitory computer-readable medium comprising instructions that, when executed, cause one or more processors to perform steps of:
    monitoring traffic via a cloud, the traffic being monitored inline between one or more endpoints and one or more destinations;
    receiving, at the cloud configured as an explicit HTTPS proxy for an endpoint of the one or more endpoints, a connection request on a shared port comprising a Transmission Control Protocol (TCP) port 443 or Quick User Datagram Protocol (UDP) internet Connection (QUIC) on UDP port 443;
    performing a mutual Transport Layer Security (mTLS) handshake with the endpoint of the one or more endpoints as an initial proxy onboarding step and in lieu of transmitting a clear-text HTTP CONNECT message based on a request to a destination of the one or more destinations;
    deriving endpoint information based on the mTLS handshake, including deriving a user identity from a client certificate presented by the endpoint and deriving a tenant or customer identity from a Server Name Indication (SNI) conveyed in a ClientHello, the SNI optionally being protected using Encrypted Client Hello (ECH); and
    performing one or more actions on the request based on the endpoint information, including authorizing or denying the request to the destination without decrypting application-layer TLS of subsequent traffic between the cloud and the destination.

9. The non-transitory computer-readable medium of claim 8, wherein the one or more actions includes allowing the request to the destination or blocking the request to the destination.

10. The non-transitory computer-readable medium of claim 8, wherein the one or more actions includes allowing the request to the destination, and the steps further comprise:
    creating a connection between the endpoint and the destination; and
    enforcing policy on traffic between the endpoint and the destination based on the endpoint information, wherein the policy is enforced while maintaining end-to-end TLS between the cloud and the destination without decrypting a destination-facing TLS session.

11. The non-transitory computer-readable medium of claim 10, wherein creating the connection between the endpoint and the destination includes creating a connection between the cloud and the endpoint and a connection between the cloud and the destination, the connection between the cloud and the endpoint being carried over HTTP/2 or HTTP/3 to support request multiplexing so as to avoid repeating the mTLS handshake for subsequent requests.

12. The non-transitory computer-readable medium of claim 8, wherein performing the mTLS handshake includes receiving the client certificate and the SNI from the endpoint, the SNI encoding the customer identity associated with the endpoint.

13. The non-transitory computer-readable medium of claim 12, wherein the deriving endpoint information includes deriving the user identity from the client certificate and deriving the customer identity from the SNI.

14. The non-transitory computer-readable medium of claim 8, wherein prior to performing the mTLS handshake, the steps include performing any of a TCP handshake with the endpoint via a pre-defined port including the TCP port 443, and performing a QUIC handshake via a pre-defined port including the UDP port 443.

15. A server associated with a cloud comprising:

one or more processors; and memory comprising instructions that, when executed, cause the one or more processors to monitor traffic via the cloud, the traffic being monitored inline between one or more endpoints and one or more destinations;

receive, at the cloud configured as an explicit HTTPS proxy for an endpoint of the one or more endpoints, a connection request on a shared port comprising Transmission Control Protocol (TCP) port 443 or Quick User Datagram Protocol (UDP) Internet Connection (QUIC) on UDP port 443;

perform a mutual Transport Layer Security (mTLS) handshake with the endpoint of the one or more endpoints as an initial proxy onboarding step and in lieu of transmitting a clear-text HTTP CONNECT message based on a request to a destination of the one or more destinations;

derive endpoint information based on the mTLS handshake, including deriving a user identity from a client certificate presented by the endpoint and deriving a tenant or customer identity from a Server Name Indication (SNI) conveyed in a ClientHello, the SNI optionally being protected using Encrypted Client Hello (ECH); and perform one or more actions on the request to the destination based on the endpoint information, including authorizing or denying the request without decrypting application-layer TLS of subsequent traffic between the cloud and the destination.

16. The server of claim 15, wherein the one or more actions includes allowing the request to the destination or blocking the request to the destination.

17. The server of claim 15, wherein the one or more actions includes allowing the request to the destination, and wherein the instructions further cause the one or more processors to:

create a connection between the endpoint and the destination; and enforce policy on traffic between the endpoint and the destination based on the endpoint information, wherein the policy is enforced while maintaining end-to-end TLS between the cloud and the destination without decrypting a destination-facing TLS session.

18. The server of claim 17, wherein creating the connection between the endpoint and the destination includes creating a connection between the cloud and the endpoint and a connection between the cloud and the destination, the connection between the cloud and the endpoint being carried over HTTP/2 or HTTP/3 to support request multiplexing so as to avoid repeating the mTLS handshake for subsequent requests.

19. The server of claim 15, wherein performing the mTLS handshake includes receiving the client certificate and the SNI from the endpoint, the SNI encoding the customer identity associated with the endpoint.

20. The server of claim 19, wherein the deriving endpoint information includes deriving the user identity from the client certificate and deriving the customer identity from the SNI.

*    *    *    *    *